(No Model.)

F. H. BIRCHARD.
BICYCLE SUPPORT.

No. 480,061. Patented Aug. 2, 1892.

Witnesses.
O. N. Keeney,
Arthur L. Morsell.

Inventor.
Francis H. Birchard
By C. T. Benedict
Attorney.

UNITED STATES PATENT OFFICE.

FRANCIS H. BIRCHARD, OF MILWAUKEE, WISCONSIN.

BICYCLE-SUPPORT.

SPECIFICATION forming part of Letters Patent No. 480,061, dated August 2, 1892.

Application filed October 9, 1891. Serial No. 408,270. (No model.)

*To all whom it may concern:*

Be it known that I, FRANCIS H. BIRCHARD, of Milwaukee, in the county of Milwaukee and State of Wisconsin, have invented a new and useful Improvement in Bicycle-Supports, of which the following is a description, reference being had to the accompanying drawings, which are a part of this specification.

My invention has relation to attachments for bicycles of that class known as bicycle-supports.

The object had in view is to provide a permanent attachment for a bicycle which, while the machine is in use, may be so adjusted as not to interfere in the least with the perfect running thereof, and on the other hand, when the machine is not in use, to afford a perfect support therefore.

With the above object in view the invention consists in the improved construction and combination of parts, as hereinafter more fully described and set forth.

Figure 1:
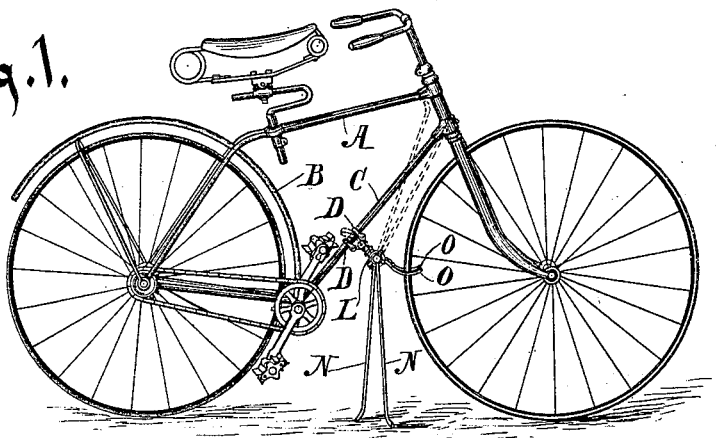
Figure 2:
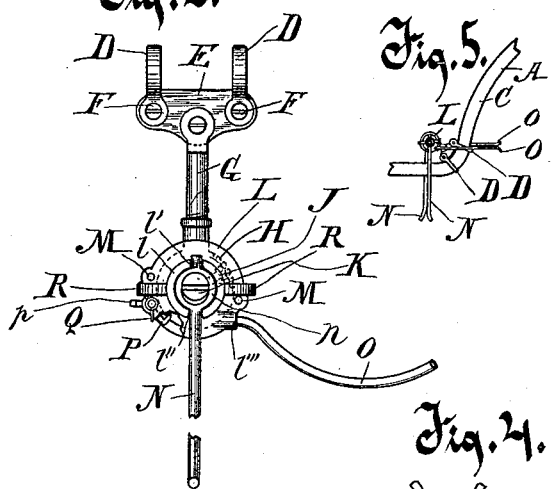
Figure 5:
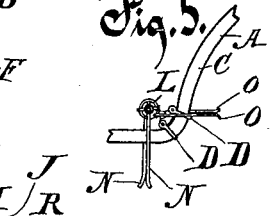
Figure 3:
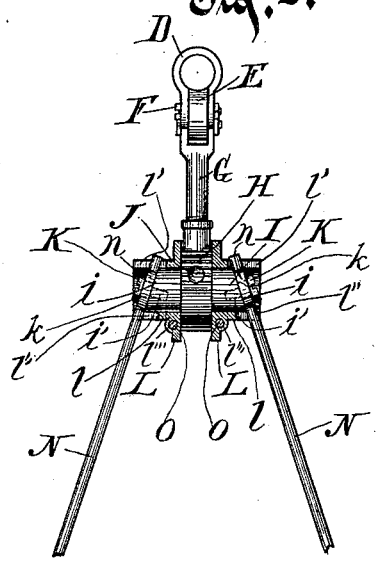
Figure 4:
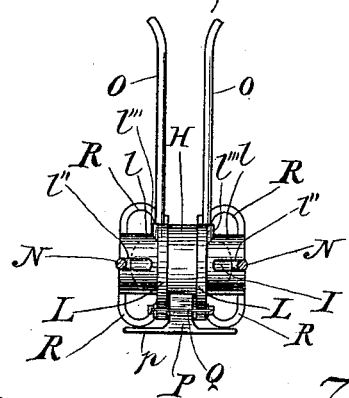

In the accompanying drawings, Figure 1 is an elevation of a bicycle having my improved attachment applied thereto and showing the same adjusted so as to support the machine in an upright position. Fig. 2 is a side elevation. Fig. 3 is a front view in elevation, a portion being shown in section. Fig. 4 is an inverted plan view, and Fig. 5 is a detail of a modification.

Like letters of reference refer to like parts throughout the several views.

Referring to the drawings, the letter A indicates a bicycle, and B the frame thereof.

To the inclined member or bar C of the frame is attached my improved device. The attachment is effected by means of clips D D, which embrace the inclined rod C and are secured at their lower ends to a plate E by means of transverse screws F F. Secured at one end to said plate E is an arm G, having its opposite end screw-threaded to fit the threaded socket of a segmental rack H. While I have shown the plate E, arm G, and segmental rack H as being composed of separate pieces, I do not wish to be understood as limiting myself to this construction, as it is obvious that the plate and arm may be made integral and the segmental rack separate, or the arm and segmental rack integral and the plate separate, or all three parts may be cast in one, as convenience and practice may suggest most suitable and desirable without departing from the spirit and scope of my invention. Passing centrally through the segmental rack is a transverse non-rotatable shaft I, said shaft having its opposite ends beveled, as indicated at $i$, the bevels running from the rear forwardly and outwardly and constituting cam-surfaces, as will hereinafter more fully appear. The segmental rack is secured rigidly to this shaft by means of the screw J, or, if preferred, the segmental rack may be cast integral with the shaft. These cam ends have extending therein for a suitable distance screw-threaded recesses $i'$ $i'$, adapted to receive the threaded shanks of screws K K. The shanks of these screws, as will appear from the dotted portions thereof in Fig. 3 and as indicated at $k$ $k$, are enlarged at the points directly contiguous to the heads, said portions being free from the screw-threads.

The letters L L indicate two disks suitably united at corresponding points of their peripheries by a transverse bolt or rivet M. These disks are located upon opposite sides of the segmental rack, and of course are provided with registering apertures to receive the transverse non-rotatable shaft. They are further provided with outwardly-extending tubular portions $l$ $l$, which surround the shaft I, and preferably extend beyond the ends thereof. Said tubes are provided upon the upper portion of their cylindrical surfaces with slots $l'$ $l'$, while upon their lower surfaces are provided similar slots $l''$ $l''$.

The supporting standards or rods are indicated by the letters N N and are bent angularly at their lower ends, so as to afford a broad bearing-surface, while at their upper ends they are provided with enlarged circular and apertured heads $n$ $n$, the apertures thereof adapted to receive the plane portions of the shanks of screws K K and rotate thereon, said plane portions of the screws being of a width equal to the thickness of the heads of the supporting rods or arms. The screws enter the cammed or beveled ends of the shaft I at a slight incline, and when screwed home confine the heads of the supporting-standards between the cammed or beveled ends and the heads of the screws, care being taken, however, that the confining-surfaces do not bear too tightly, as in that event the free swingin or circular motion of the supporting-standards would be interfered with.

The tubular portions $l\ l$ of the disks are provided with screw-threaded sockets $l'''\ l'''$, adapted to receive curved arms O O, which receive the front pivot-wheel of the machine between them and prevent said wheel from turning when the bicycle is supported in an upright position. Pivoted between the two disks, at the forward ends thereof, is a pawl or dog P, which is adapted to engage the teeth of the segmental rack. This pawl or dog is preferably of angular form, as clearly shown in Fig. 2, and projects from its pivot-point forward a slight distance, where it is provided with a transverse integral arm $p$, serving as a finger-piece for conveniently manipulating the same. A spring Q surrounds the pivot and has its free end bearing against the pawl in order to hold the same normally in engagement with the teeth of the ratchet. Handles R R project from diametrically-opposite points of the tubular extensions $l\ l$, which serve to turn the disks and the parts carried thereby.

From the foregoing description, taken in connection with the accompanying drawings, the construction of my improved device will be readily understood without requiring further explanation.

In operation when the machine is supported in an upright position the parts assume the position shown in full lines, Fig. 1. If now the rider desires to mount the machine, all that is required on his part is to press upon the finger-piece $p$ and release the pawl from engagement with the ratchet-teeth. After this is done the disks L L are free to be rotated upon the shaft I, and this is accomplished conveniently by grasping the handles R R and exerting a pull rearward. It will be noticed that when the rods or standards N N are in their supporting position, as shown in Fig. 1, their lower ends are diverged or spread out, so as to present a broad base. As the disks are turned rearwardly, however, in the manner just described, the rods are made to converge, this being effected by means of the peculiar cam formation of the ends of shaft I, against which the heads of the rods bear. As previously explained, this shaft I is non-rotatable, and when the supporting-rods are adjusted to the position shown in Fig. 1 the heads thereof bear against the surface of the cam or bevel which projects the farthest out, thereby necessarily forcing said rods or standards outward. The standards when the disks are rotated move therewith, being held in the tubular portion by the openings $l'\ l'$ and $l''\ l''$, and as they are thus moved the heads of said rods or standards gradually recede from the outermost surfaces of the cams or bevels and consequently approach nearer to each other, so as to be brought in close to the machine, and thereby presenting little liability to damage by contact with obstructions and the like. When the standards have been adjusted rearwardly to the proper position, as indicated in dotted lines, Fig. 1, the finger-piece is released and the pawl allowed to again engage the teeth and hold the device in its adjusted position. In ladies' bicycles, and perhaps in other styles of machines, the bar corresponding to bar C upon the accompanying drawings will be closer to the ground, and consequently the supporting-standards would be rendered too long and have a tendency to lift the fore part of the machine clear of the ground. A convenient way of guarding against this when my device is applied to such makes of machines is merely to reverse the attachment, as shown in the modification, Fig. 5. In order to accomplish this, the clips should so embrace the frame-bar as to throw the disks and the other parts above the same, which will of course elevate the supporting-rods and cause them to straddle said bar. In order to insure the accomplishment of this, however, it is further necessary to remove screw J, which screws arms G rigidly to shaft I, and then turn the segmental rack and parts carried thereby to a position opposite to that shown in Fig. 2.

From the foregoing it will be seen that my invention accomplishes in a simple and expeditious manner a safe and efficient support for the machine when not in use, at the same time not marring in the least the appearance of the bicycle.

While I have in the present illustration shown the device in connection with the so-called "Safety" bicycle, it is obvious that it can be employed with any other style or make of machine by simply applying the attachment to the framework thereof. It is also to be stated that by increasing the inclinations or bevels of the ends of shaft I the degree of divergence and convergence of the supporting-standards may be respectively increased and diminished.

Having thus described my invention, what I claim as new, and desire to secure by Letters Patent, is—

1. In a support for bicycles, the combination of the bicycle-frame, a non-rotatable shaft secured to and projecting out laterally from opposite sides of the frame, said shaft having its opposite ends provided with cammed or beveled surfaces, disks rotatably mounted upon said shaft, supporting-standards rotatable with the disks, said standards turning against the cammed surfaces, and means for holding the disks in adjusted position, substantially as set forth.

2. In a support for bicycles, the combination of the frame thereof, a segmental rack secured thereto, a non-rotatable shaft passing through said segment, supporting-standards movable upon said shaft, and a spring-actuated pawl for controlling the supporting-standards in their adjusted positions, substantially as set forth.

3. In a support for bicycles, the combination of the frame thereof, a segmental rack secured thereto, a non-rotatable shaft passing through said segment and having upon its opposite ends bevel or cam surfaces, supporting-standards having their inner ends bearing against the beveled ends of the non-rotatable shaft and rotatable upon screws or trunnions extending therefrom, and a spring-actuated pawl for controlling the supporting-standards, substantially as set forth.

4. In a support for bicycles, the combination of the frame thereof, an arm connected thereto, said arm formed or provided upon its outer end with a segmental rack, disks upon opposite sides of the segment, a non-rotatable shaft passing through registering apertures in said segment and disks, said shaft provided upon its opposite ends with beveled or cammed surfaces, supporting-standards secured upon screws or trunnions extending from the beveled or cammed ends and rotatable with the disks, and a spring-actuated pawl engaging the ratchet-teeth of the segment, substantially as set forth.

5. In a support for bicycles, the combination of the frame thereof, an arm connected thereto, said arm formed or provided upon its outer end with a segmental rack, disks upon opposite sides of the segment, said disks provided with laterally-tubular extensions, a non-rotatable shaft passing through registering apertures in the segment and disks, said shaft provided upon the opposite ends with beveled or cammed surfaces, supporting-standards passing through slots or recesses in the tubular extensions and turning with the disks upon screws or trunnions extending from the non-rotatable shaft, and means for holding the disks and supporting-standards in their adjusted position, substantially as set forth.

6. In a support for bicycles, the combination of the frame thereof, an arm connected thereto, said arm formed or provided upon its outer end with a segmental rack, disks upon opposite sides of the segment, a non-rotatable shaft passing through registering apertures in the segment and disks, said shaft provided upon opposite ends with beveled or cammed surfaces, supporting-standards secured upon screws or trunnions extending from the beveled or cammed ends and rotatable with the disks, and a spring-actuated angular pawl for engaging the teeth of the segment provided at its outer end with a finger-piece at right angles thereto, substantially as set forth.

7. The combination, with the frame of a bicycle, of rods pivoted to a non-movable portion thereof, said rods being non-movable laterally and adapted to swing in an arc of a circle upon their pivot so as to embrace the wheel of the machine and prevent the same from turning laterally upon its pivot, substantially as set forth.

8. In a support for bicycles, the combination of supporting-standards pivoted to a non-movable portion of said frame constructed to be swung down to engage the ground, and rods working upon the same pivot, non-movable laterally and constructed to move in an arc of a circle simultaneously with the supporting-standards so as to embrace the wheel of the machine and prevent the same from turning laterally upon its pivot, substantially as set forth.

In testimony whereof I affix my signature in presence of two witnesses.

FRANCIS H. BIRCHARD.

Witnesses:
C. T. BENEDICT,
ARTHUR L. MORSELL.